Feb. 11, 1941.   G. F. RACKETT   2,231,548
METHOD OF PROJECTING PICTURES
Filed Sept. 20, 1939
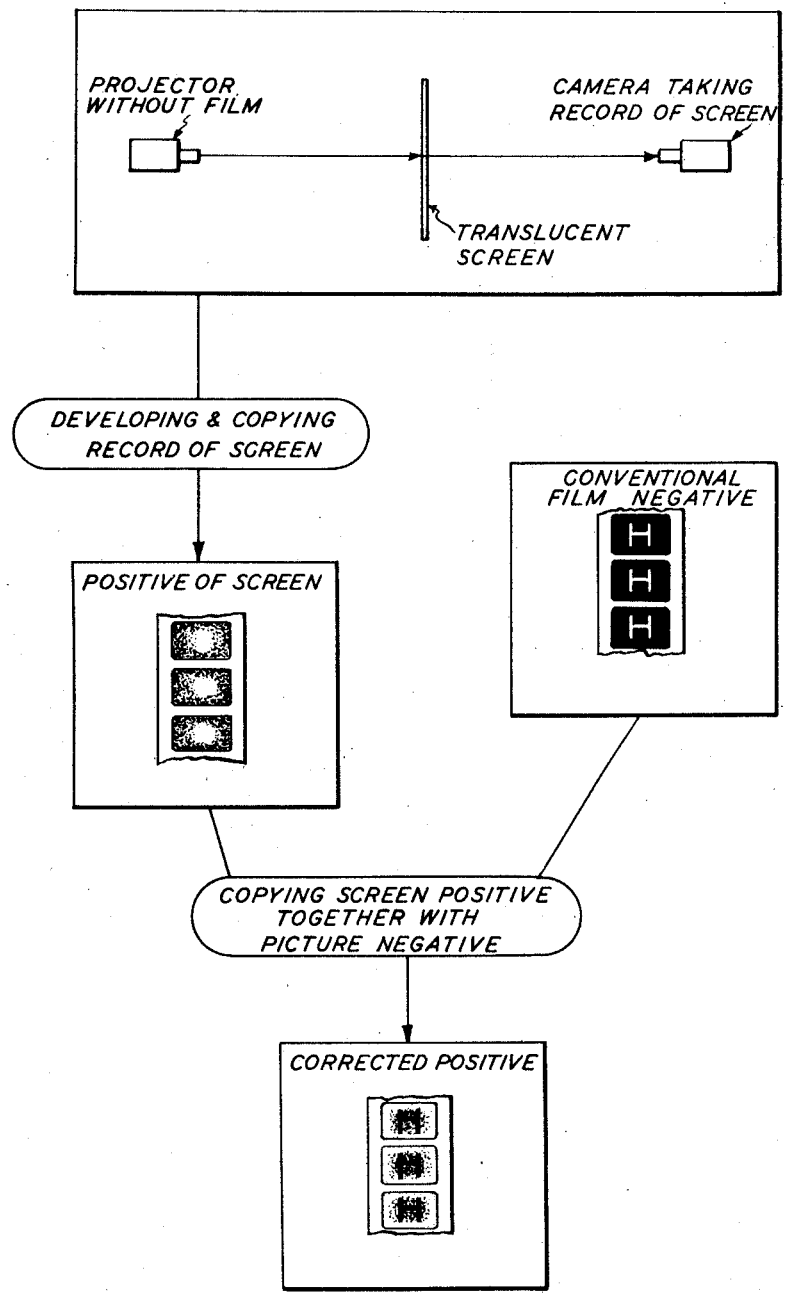

Patented Feb. 11, 1941

2,231,548

UNITED STATES PATENT OFFICE 2,231,548

METHOD OF PROJECTING PICTURES

Gerald F. Rackett, Los Angeles, Calif., assignor to Technicolor Motion Picture Corporation, Los Angeles, Calif., a corporation of Maine Application September 20, 1939, Serial No. 295,775

6 Claims. (Cl. 88—16)

Ordinarily a picture projected on a screen is not uniform in brightness throughout the entire area of the picture due to variations in the light intensity throughout the cross-sectional area of the projector beam of light. Usually the picture is brighter in the middle than at the margins, the brightness gradually decreasing from the center outwardly. While this non-uniformity is not serious in ordinary picture exhibitions it is quite objectionable in taking pictures with so-called background projection, that is, photographing a scene comprising foreground action in front of a translucent background screen upon which a background scene is projected from the rear, particularly in the case of color photography.

Objects of the present invention are to provide a method of exhibiting pictures which avoids the aforesaid irregularity in brightness throughout the area of the projected pictures and which is simple and inexpensive to practice.

According to the present invention the picture film to be projected is given an increment of exposure which varies throughout the area of each picture in proportion to the variation in intensity of the light throughout the projector beam, whereby the developed picture has an increment of density which varies throughout its area in proportion to the variation in intensity of the light throughout the cross-sectional area of the projector beam. Thus the modulated density of each picture counteracts the uneven intensity of the projector beam, whereby the pictures projected on the screen show no lack of uniformity in brightness.

The preferred method of giving the film the aforesaid increment of exposure, in addition to or in conjunction with the picture exposure, involves the following procedure. While projecting light from the projector to the screen, with no picture film in the projector, the translucent screen is photographed, from the side opposite to the projector, to expose a negative which has an uneven density corresponding to the uneven intensity of the projector beam, being more dense throughout the area corresponding to the intense portion of the beam of light. From this negative a positive is formed, either by reversal or by printing, the positive being less dense throughout the area corresponding to the intense portion of the projector beam. Then in printing the picture film to be projected it is printed through the aforesaid positive as a modulator, the positive obstructing less printing light in the area corresponding to the intense portion of the projector beam, thereby causing the printed picture to be denser in the area corresponding to the intense portion of the projector beam. Thus for use in the ordinary projector having a beam of gradually decreasing intensity from the center of the beam outwardly to its periphery, the aforesaid increment of density gradually decreases from the center of each picture outwardly to the margins thereof. This preferred embodiment is illustrated in the single diagrammatic figure of the accompanying drawing.

Instead of forming the aforesaid negative by exposure to the illuminated screen as above described it may be formed by exposure to an illuminated surface which is painted or otherwise shaded to simulate the illuminated screen, being light in the middle and gradually shading to darker at the margins.

In a more specific aspect the invention involves printing a motion picture film in natural colors with the aforesaid added increment of density, projecting pictures from the film to a background projection screen and concomitantly photographing in natural colors the pictures on the background screen together with a real foreground scene. In this way the color pictures are not only uniform in brightness but the various colors are well balanced in relation to each other.

The color film for use in the background projection is preferably formed by imbibition in the following manner. Color separation negatives of the background scene are exposed and developed. From these negatives positives are printed (either directly or indirectly), developed and etched to form mechanical printing relief matrices with which the different color aspects are successively printed in superposition on a suitable blank film or on a film in which a black-and-white key-print of the scene has already been printed and developed. In this case the aforesaid modulating increment may be incorporated in the black-and-white key-print or in one or more of the printing matrices or partly in each. Thus the so-called "corrected positive" of the drawing may be either the key-print or one of the relief matrices.

It should be understood that the present disclosure is for the purpose of illustration only and that this invention includes all modifications and equivalents which fall within the scope of the appended claims.

I claim:

1. In exhibiting pictures on a screen with a projector which has a tendency to produce excessive brightness throughout a portion of the screen, the method of counteracting the aforesaid tendency which comprises forming a negative having greater intensity of exposure throughout the portion of the latent image corresponding to said portion, with said negative forming a developed positive having less density throughout the portion of the developed picture corresponding to said portions, and printing the picture film through said developed positive as a modulator, whereby the developed picture film has increased density throughout the portion corresponding to said portions which counteracts the aforesaid tendency towards increased brightness throughout said portion of the screen.

2. In exhibiting pictures on a screen with a projector which has a tendency to produce increasing brightness from the margins toward the center of the picture on the screen, the method of counteracting the aforesaid tendency which comprises forming a negative having increasing intensity of exposure from the margins toward the center of the latent image, with said negative forming a developed positive having decreasing density from the margins toward the center of the developed picture, and printing the picture film through said developed positive as a modulator, whereby the developed picture film has increasing density from the margins toward the center of the picture which counteracts the aforesaid tendency towards increasing brightness from the margins toward the center of the projected picture.

3. In exhibiting pictures on a screen with a projector which has a tendency to produce increasing brightness from the margins toward the center of the picture on the screen, the method of counteracting the aforesaid tendency which comprises forming a negative having increasing intensity of exposure from the margins toward the center thereof, from said negative printing a positive having decreasing density from the margins toward the center thereof, and printing the picture film through said positive as a modulator, whereby the developed picture film has increasing density from the margins toward the center of the picture which counteracts the aforesaid tendency towards the increasing brightness from the margins toward the center of the screen.

4. In photographing a scene comprising a real foreground and a picture background formed on a screen with a projector which produces a certain increase of brightness from the margins toward the center of the picture on the screen, the method which comprises forming a negative having a corresponding increase of intensity of exposure from the margins toward the center of the latent image, with said negative forming a developed positive having a corresponding decrease of density from the margins toward the center of the developed picture, printing the picture film through said developed positive as a modulator and while projecting said picture film on the screen to form a background photographing both the foreground and the background to form a finished picture.

5. In exhibiting pictures on a screen with a projector which has a tendency to produce excessive brightness throughout a portion of the screen, the method of counteracting the aforesaid tendency which comprises projecting light from the projector to the screen without picture film in the projector while concomitantly photographing the screen to expose a negative having greater intensity of exposure throughout the portion of the latent image corresponding to said portion, with said negative forming a developed positive having less density throughout the portion of the developed picture corresponding to said portions, and printing the picture film through said developed positive as a modulator, whereby the developed picture film has increased density throughout the portion corresponding to said portions which counteracts the aforesaid tendency towards increased brightness throughout said portion of the screen.

6. In photographing a scene comprising a real foreground and a picture background formed on a screen with a projector which produces increasing brightness from the margins toward the center of the picture on the screen, the method which comprises projecting light from the projector to the screen without picture film in the projector while concomitantly photographing the screen without said foreground to expose a negative having increasing intensity of exposure from the margins toward the center of the latent image, with said negative forming a developed positive having decreasing density from the margins toward the center of the developed picture, printing the picture film through said developed positive as a modulator and while projecting said picture film on the screen to form a background photographing both the foreground and the background to form a finished picture.

GERALD F. RACKETT.